United States Patent [19]

Charalambous et al.

[11] Patent Number: 5,530,744
[45] Date of Patent: Jun. 25, 1996

[54] METHOD AND SYSTEM FOR DYNAMIC CUSTOMIZED CALL ROUTING

[75] Inventors: Salomi T. Charalambous, Holmdel; Sanja Durinovic-Johri, Aberdeen; Yonatan A. Levy, Manalapan, all of N.J.

[73] Assignee: AT&T CORP., Murray Hill, N.J.

[21] Appl. No.: 309,361

[22] Filed: Sep. 20, 1994

[51] Int. Cl.$^6$ .............................. H04M 3/36; H04M 7/00
[52] U.S. Cl. ...................... 379/265; 379/207; 379/112
[58] Field of Search ........................ 379/201, 209, 379/207, 213, 221, 265, 196, 211, 212, 266, 113, 309, 112

[56] References Cited

U.S. PATENT DOCUMENTS

| | | | |
|---|---|---|---|
| 4,400,587 | 8/1983 | Taylor et al. | 379/113 |
| 4,737,983 | 4/1988 | Frauenthal et al. | 379/113 |
| 4,953,204 | 8/1990 | Cuschleg, Jr. et al. | 379/309 |
| 5,025,468 | 6/1991 | Sikand et al. | 379/309 |
| 5,164,983 | 11/1992 | Brown et al. | 379/207 |
| 5,335,268 | 8/1994 | Kelly, Jr. et al. | 379/221 |

Primary Examiner—Jeffery Hofsass
Assistant Examiner—Scott Wolinsky

[57] ABSTRACT

A cooperative network/premises-based automatic call distributor system and method predicts changes in automatic call distributor status between periodic updates of the measured status obtained by a Telemarketing Operations Performance Management System (TOPMS). A call directed to a telemarketing complex arrives at the network. The caller automatic number identification (ANI) and an identifying tag are forwarded via a data connection to a customer routing point. The Next Available Agent (NAA) application enables 800-service customers to control the routing of calls to multiple customer sites (ACDs) via a Customer Routing Point (CRP). This control is based on periodic updates of the status of each site provided by a Telemarketing Operations Performance Management System (TOPMS) in an Intelligent Call Processing (ICP) environment. A customized routing method is incorporated into a new CRP-based load balancing method for the NAA. The method offers flexibility to address diverse customer needs such as geographic preferences and constraints, least cost preferences, performance thresholds, and performance objectives.

32 Claims, 4 Drawing Sheets

| CALL ORIGINATION | SITE PREFERENCE | CONDITION(S) |
|---|---|---|
| REGION 1 | 1 | SITE 1 STATUS: GREEN OR YELLOW |
|  | 3 | SITE STATUS: GREEN |
|  | 4 | SITE STATUS: GREEN |
|  | 5 | SITE STATUS: GREEN |
|  | 2 | SITE STATUS: GREEN |
|  | • | • |
|  | 14 | SITE STATUS: GREEN |
| REGION 2 | 2 | SITE 1 STATUS: GREEN OR YELLOW |
|  | 1 | SITE STATUS: GREEN |
|  | • | • |

| SITE ID | CONDITION(S) |
|---|---|
| 1 | SITE STATUS: NOT RED 2 |
| 2 | SITE STATUS: NOT RED 2 |
| • | • |
| • |  |

METHOD AND SYSTEM FOR DYNAMIC CUSTOMIZED CALL ROUTING

TECHNICAL FIELD

The present invention relates generally to a method for telemarketing, and more particularly, to a network assisted method for automatic call distribution.

BACKGROUND OF THE INVENTION

Telemarketing, i.e., the use of telecommunications systems for sales purposes, is widely used by retailers, wholesalers, or more generally, vendors for selling services and equipment and for providing customer information with respect to such sales. A vendor-provided automatic call distributor (ACD) typically connects customers calling that vendor to one of a group of attendants, generally at one premise, who accept orders and/or provide customer information to the caller. The routing and queuing functions provided by the ACD preferably makes most efficient use of all available agents, allowing the agents time between calls to perform necessary and ancillary functions related to customer service, while minimizing delays and busy signals to the customer.

Since an ACD services a single premise, efficient management of the queue at a premise is limited. Methods to manage incoming calls among different premises have included both network and premises based solutions. An example of a premises based solution is the programming of each ACD to determine if its existing capacity threshold is exceeded. If the capacity threshold is exceeded, the affected ACD queries a first "overflow" ACD via an interflow trunk to determine if it can accept the call without exceeding its threshold. If the threshold is not exceeded, the "overflow" ACD will accept the call. If the ACD threshold will be exceeded, the next overflow ACD is queried via another interflow transfer, and the process of call acceptance or additional ACD queries is repeated until the call is ultimately accepted by an ACD, is blocked, or the calling party disconnects. This solution is undesirable because of the expense of required interflow trunks and the general inability of the method to address call congestion at any ACD on a campaign-by-campaign basis.

An example of a network solution is the use of the 800 service Service Management System (SMS) to realize multi-locational capabilities. For example, based on historical traffic statistics at various premises, as well as the time zone and planned staffing of the respective premises, calls to telemarketing agents via 800 numbers are routed by the network to an appropriate premise, which then receives the call and routes it to an agent via the premise ACD. This type of routing is based on statistical averages, and therefore, cannot account for realtime fluctuations in the calling load and for changes in available staff. Furthermore, such a method only accounts for calls to 800 numbers; customer service premises may also receive a large number of calls via local exchange companies (LECs) as well as foreign exchanges.

Thus, rather than focusing on maintaining balanced levels of service among ACDs, the prior art has focused primarily on methods that prevent the blocking of calls from the public switched telecommunications network (PSTN) at any of a plurality of ACDs or methods that result in customer-specified allocation of calls among a plurality of ACDs where access to the network of ACDs is gained through one toll-free telephone number. The following patents are illustrative of this prior art.

U.S. Pat. No. 4,191,860 issued to R. P. Weber on Mar. 4, 1980, allows calls to be allocated to individual ACDs on a fixed percentage basis as specified by the telemarketer. This method does not have the capability to dynamically adapt to variable conditions encountered when load balancing is attempted. Other arrangements have been devised where load balancing is attempted by semiautomatic means.

U.S. Pat. No. 4,611,094 issued to R. L. Asmuth et al. on Sep. 9, 1986, describes a method that allows a telemarketer to customize 800 service call processing logic based on additional call processing instructions obtained from a call originator. While this method may be used to redirect call among ACDs in response to information provided by call originators, its usefulness as a means of load balancing is dependent upon the ability of the telemarketer to change parameters and re-initiate the customer record program that directs specific announcements to callers. This method is ill prepared to meet a telemarketer's need to modify call processing logic in order to accomplish real-time load balancing.

U.S. Pat. No. 4,737,983 issued to J. C. Frauenthal et al. on Apr. 12, 1988, describes a method for balancing 800 telephone service call loads based on the state of traffic congestion at each of the multiple locations receiving calls. Each of the sites periodically transmits a message to an update processor specifying the length of call queues in each of these sites. The update processor decides for each time interval (typically 30 seconds long), which site should receive calls during the next interval. This information is transmitted to a network control point which actually allocates calls to the site in response to this information. Specifically, a switching office receiving a call destined for one of the telemarketer's ACDs may query a central database associated with the network control point to determine the current state of traffic congestion for a plurality of the telemarketer's ACDs and—based on that information—direct the call to an alternate ACD when warranted. Note, that this arrangement allows routing policies to dynamically change at every update; however, the policy must remain static between two consecutive updates. Since there might be substantial delay between the time the routing policy is determined and the time a call is actually routed there, this arrangement may be far from "optimal". This type of method will not perform well if updates are not synchronized. In addition, it is not flexible to take different customer needs into account. This method is limited to load balancing of premises queues, and does not consider the fact that call handling capabilities may vary among locations receiving calls.

U.S. Pat. No. 4,788,718 issued to S. D. McNabb et. al. on Nov. 29, 1988, describes a method and network arrangement for compiling PSTN traffic analysis data for an 800 telephone service, based on call data collected through a common channel signaling (CCS) network. The objective of the McNabb method is to contemporaneously reduce total call blocking to multiple TCs having specialized call handling capabilities that may differ among locations receiving calls. This approach to load balancing relies exclusively on the telemarketer's knowledge of 800 service call volume for a single 800 number and does not consider ACD performance data or any other information that may be obtained from the telemarketer's premises.

In order to improve multi-locational efficiency and dynamic response to load changes, U.S. Pat. No. 5,164,983 issued to P. B. Brown et al. on Nov. 17, 1992 provides a premises-based telemarketing agent management system for managing a telemarketing complex in which a traffic control center processor receives information from both telemarketer premises-based information sources and PSTN-based information sources, and processes this information in order to dynamically and automatically generate signals for implementing call routing changes needed to balance service among telecommunications centers in the telemarketing complex. However, even such a "real-time" system is limited by having the telemarketing premises management system dynamically control the routing of future calls based on calls already received at the ACDs of the telemarketing complex. Further, such dynamic control requires changing call processing logic programs stored in the PSTN, or recommending changes in staffing levels, or a combination thereof. Such a system, although responsive to the "real time" call load, is limited to managing the call load at a higher level (via existing 800 service call routing logic), which generally requires a longer response time, less control, and an inherently more approximate global solution than, for example, control on a call-by-call basis.

U.S. Pat. No. 5,291,550 to Y. A. Levy et al. discloses a dynamic routing arrangement which provides call by call routing decisions based on network real-time information of the number of calls in progress (CIP) and partial, infrequent information from customer premises. The disclosed dynamic network call distributor also allows separation of calls into multiple caller classes and bases the decision as to where a call should be routed on the class. The performance depends on the estimate of queue size at each site. Typically, number of calls in progress does not differentiate between calls in queue and calls being handled by agents. In addition, it does not include local calls. Queue size is estimated as a difference between CIP and total number of agents at each site. Number of agents, on the other hand, also vary. Thus, decisions based on this data may be less than optimum.

Thus, among other limitations, prior art solutions require network connections and premises queuing that typically do not realize multi-locational efficiencies and true real-time response.

SUMMARY OF THE INVENTION

The present invention overcomes the above, and other, limitations by providing an automatic calling distributor, wherein overall call distribution efficiency is enhanced by selecting a destination from a plurality of destinations on a call-by-call basis. In accordance with the present invention, routing decisions are based on periodic real time data that gives correct queue size and number of agents per each site. Between updates, the status of each site is evaluated by keeping track of the number of calls routed to each site and by predicting the amount of "local" traffic and call completions at each site and accordingly providing call-by-call routing decisions. In an embodiment of the present invention, a customer call arriving at the network via a special access dialing code (e.g., "800") is temporarily suspended at either a network switch or an adjunct processor. The caller automatic number identification (ANI) and the dialed 800 number are forwarded via a data connection to a Customer Routing Point (CRP). The CRP, which performs the site evaluation process, provides routing information to the network for completing the call to an appropriate ACD. A Next Available Agent (NAA) application on the CRP enables 800-service customers to control the routing of calls to multiple customer sites (ACDs) via a Customer Routing Point (CRP). This control is based on periodic updates of the status of each site provided by a Telemarketing Operations Performance Management System (TOPMS) in the Intelligent Call Processing (ICP) environment.

Further described, in accordance with an embodiment of the present invention, a cooperative network/premises-based automatic call distributor system and method is provided which is based on periodic updates of the status of each site obtained by a Telemarketing Operations Performance Management System (TOPMS). A call directed to a telemarketing complex arrives at the network. The caller automatic number identification (ANI) and an identifying tag are forwarded via a data connection to a customer routing point. A customized routing method is incorporated into a new CRP-based load balancing method for the NAA. The methods offer flexibility to address diverse customer needs such as geographic preferences and constraints, least cost preferences, performance thresholds, and performance objectives. The basic design calls for the routing function in the CRP to be broken into two pans: The Customized Router (CR) and Load Balancer (LB). The CR searches a Customer Specific Preference Table with an ordered list of destinations and conditions and makes a routing decision on a First Match basis. The First Match option allows the customer to specify a routing policy through hierarchy of routing decisions (based on geographic and/or least cost preferences and performance thresholds) to be followed in the order specified. If no match is found, then the call is sent through the LB to be routed to the site which would best balance the load and minimize overall delays. The LB uses an Eligibility Table of site-specific eligibility conditions that determine which of the sites is eligible to receive the calls routed by the LB. Both the CR and LB can use the predictions of expected performance (e.g., queue sizes and delays) at the sites provided by the Site Status Predictor, based on periodic updates from the sites.

BRIEF DESCRIPTION OF THE DRAWINGS

The invention will be described in greater detail below by way of reference to the accompanying drawings, wherein.

DETAILED DESCRIPTION OF THE PREFERRED EMBODIMENT

The present invention minimizes the networking costs associated with distributing calls to telemarketing agents in multiple locations, minimizes delays in providing desired services to callers, and improves the efficiency of telemarketing agents by providing a cooperative network/premises-based automatic call distributor for completing a connection between a customer and agent. A customer routing point manages ACD queues, using estimation techniques which account for changes in the ACD queue since the most recent measurement, and accounts for other calls to the telemarketing center that are not routed through the CRP.

Figure 1:
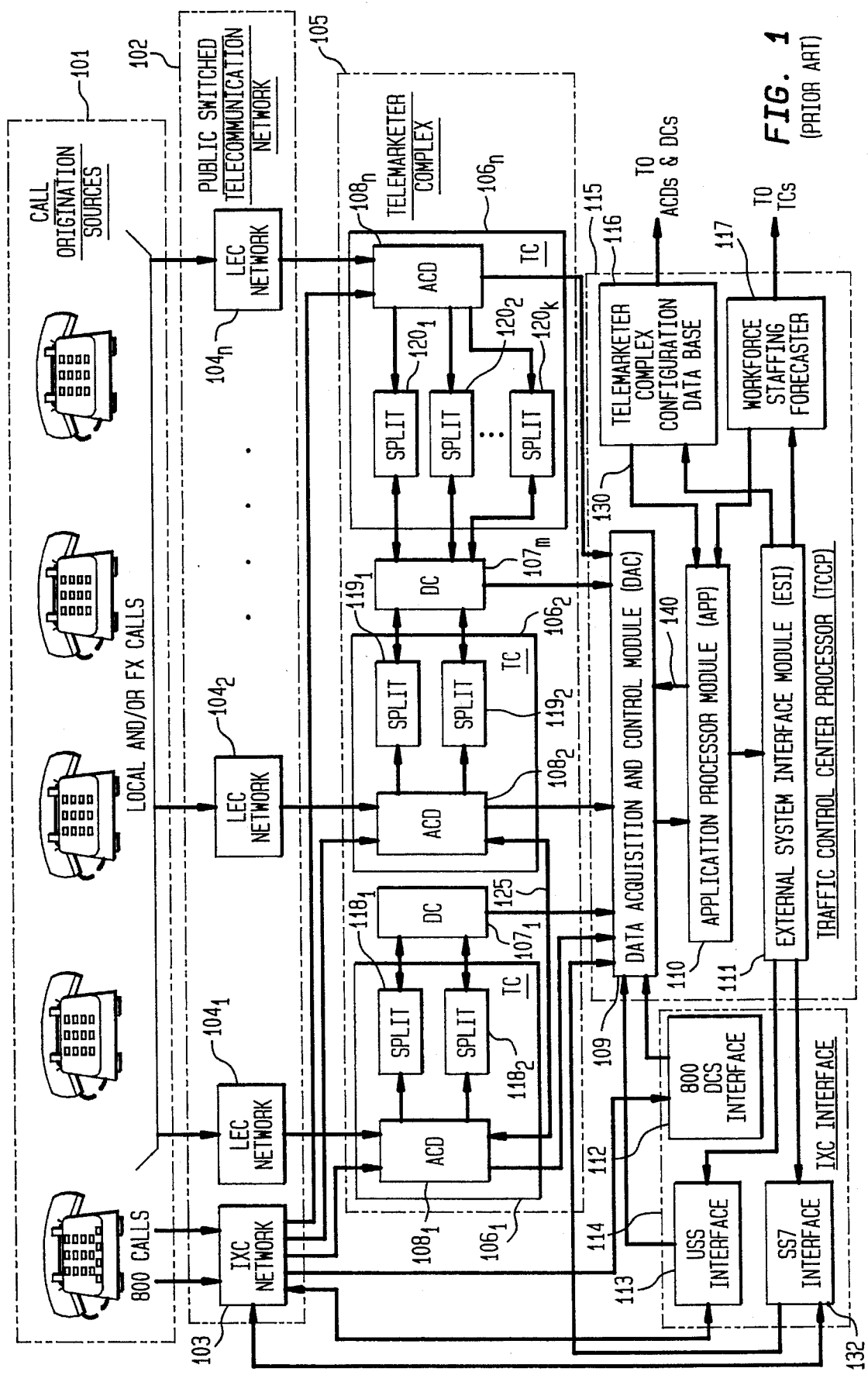
FIG. 1 illustrates a prior art system.

The present invention will be more readily understood by first considering FIG. 1, which illustrates the relationship between a traffic control center processor (TCCP) 115, a public switched telecommunications network (PSTN) 102, and a telemarketer complex 105, as similarly disclosed in U.S. Pat. No. 5,164,983 to P. B. Brown et al., described above. One skilled in the art recognizes that the present invention is not limited to the system shown in FIG. 1, which is merely illustrative, and is susceptible to many modifications and adaptations.

Telemarketer complex 105 consists of a plurality of telecommunications centers (TCs) $106_1$ through $106_a$ which may be located in different geographical areas. Typically, each TC includes at least one automatic call distributor (ACD) and one or more "splits/gates" which receive information from the associated ACD at the TC. As used herein, a "split" or "gate" refers to a group of attendant stations (sometimes called "agent terminals") which each comprise an input/out terminal and/or display means which allow an attendant at the TC to process selected calls received by the ACD. For example, as shown in FIG. 1, TC $106_1$ includes ACD $108_1$ which provides inputs to a pair of splits $118_1$ and $118_2$. TC $106_n$, on the other hand, includes ACD $108_n$ and a plurality of splits designated $120_1$ to $120_k$. TC $106_2$ also includes an ACD $108_2$ which distributes calls to splits $119_1$ and $119_2$.

Each of the TCs shown in FIG. 1 is associated with a data center (DC) which typically includes a database containing customer profiles for the telemarketer's customers and other information (such as inventory and capacity data) needed to service incoming calls. For the purposes of this application, this information is generically referred to as "customer order fulfillment data". Specifically, TC $106_1$ is associated with its own data center, DC $107_1$, while TCs $106_2$ and $106_n$ are both connected to the same DC $107_m$. Although not shown in FIG. 1, in some arrangements a given TC may be interconnected with more than one DC, and more than two TCs may be supported by the same DC. The DC associated with each TC can receive information from, and transmit information to, agents in each of the splits in the TC. In other situations, no DCs are contained in telemarketer complex 105, and customer order fulfillment data is obtained directly from the caller and/or from other sources such as books or catalogs.

In FIG. 1, ACDs $108_1$ and $108_2$ are shown interconnected by an interflow trunk 125, which permits calls to be passed directly from a receiving ACD to an alternate ACD under certain conditions, such as when a malfunction or an overload condition is detected at the receiving ACD. The process by which an overloaded ACD queries an alternate ACD in order to effect transfer of incoming calls is well known to persons skilled in the art of ACD design and operation. As will be further understood hereinbelow, such interflow trunks are not required in practicing the present invention, but are shown as an additional means for routing calls received by the ACDs.

Calls destined for telemarketer complex 105 can originate from any of a plurality of call origination sources 101. Some of the calls are applied to telemarketer complex 105 via any one of a plurality of local exchange carrier (LEC) networks $104_1$ through $104_n$ contained within the public switched telecommunications network 102. Other calls, particularly toll-free calls (e.g., "800" calls) are originated in call origination sources 101 and applied to telemarketer complex 105 via interexchange carder (IXC) network 103, which is also part of the public switched telecommunications network 102. Thus, as shown in FIG. 1 each of the ACDs $108_1$ through $108_n$ can receive and process calls from an associated one of LEC networks $104_1$ through $104_n$, as well as from IXC network 103. ACD $108_1$ receives calls from network $104_1$, ACD $108_2$ receives calls from network $104_2$ etc. Although not shown in FIG. 1, it is well known that the connection between each network 100 and an associated ACD typically involves several trunk groups.

In order to manage and control telemarketer complex 105 and permit efficient handling of traffic originated from call origination sources 101, traffic control center processor (TCCP) 115 is arranged to receive status information from each of the ACDs ($108_1$ through $108_n$) and DCs ($107_1$ through $107_m$) within customer complex 105, in a data acquisition and control module (DAC) 109. This status information describes the service level and other performance measures associated with ACD 108 as well as the status of the telemarketing campaigns served by DCs 107. In addition, DAC 109 preferably is arranged to receive two separate inputs indicative of traffic conditions and call processing logic status within interexchange carrier network 103. First, traffic volume information is received via an 800 Data Collection Service (DCS) system interface 112. An example of an 800 Data Collection Service is described in the above-cited McNabb patent. Second, an input is received from a user support system (USS) interface 113, which provides information relative to the status of "call processing logic" in effect in network 103. The operation and implementation of the call processing logic can be more fully appreciated by reading the aforementioned Weber and Asmuth patents. It is understood, that the TCCP described hereinabove is only a particular example of what may be more generically described as a telemarketing agent management system or call management system.

In order to correctly process information received from telemarketer complex 105 and IXC network 103 via IXC interface 114, DAC 109 is also provided (by telemarketer complex configuration data base 116) with information describing parameters and other configuration information that applies to telemarketer complex 105. Data collected in DAC 109 is applied to an application processor (APP) module 110 which processes the information according to a predetermined manner, such as that disclosed in the aforementioned patent to Brown et al. Generally, APP 110 generates a series of control signals which are applied to the external system interface module (ESI) 111 which may include a series of video display monitors as well as software for generating a series of control signals. These control signals are, in turn, applied to USS interface 113 and to a work force staffing forecaster 117. In response to the control signals, USS interface 113 can effect changes in the call processing logic within IXC network 103, while forecaster 117 can effect changes in staffing at various splits 118, 119 or 120 within TCs $106_1$ to $106_n$.

In addition to receiving inputs indicative of traffic conditions and call processing logic status within IXC network 103, the TCCP may also further communicate with the IXC network 103 regarding incoming calls to the IXC network in order to facilitate connection to an agent. In accordance with the present invention, and as will be further understood below, preferably a Customer Routing Point (CRP) (not shown in FIG. 1) is interfaced to the IXC network (e.g., to a network control point "NCP") and to a TCCP, and the CRP provides a platform for what is referred to hereinbelow as the "Next Available Agent" (NAA) application, which enables subscribers (e.g., 800-service customers) to control the routing of calls to their terminations. Preferably, a separate dam connection [e.g., AT&T's Intelligent Call Processing (ICP) Interface via SS7 TCAP, SNA, X.25, ISDN Non-Call Associated User-to-User Interface (NCA UUI) signaling or TCP/IP] is provided for the signaling between the TCCP and the IXC network (shown schematically as an SS7 data interface 132) and for the signaling between the CRP and the IXC network (not shown) and between the CRP and the TCCP (not shown). It is understood, however, that for communication between the TCCP and the IXC network the DCS interface or the USS interface may be adapted accordingly. As is well known to one skilled in the art, an adjunct processor (AP) (e.g., network services complex "NCSx"), a service control point (SCP) [e.g., network control point (NCP)], or a network switch (e.g., 4ESS or 5ESS) may be involved in receiving the incoming call, communicating with a CRP, routing the incoming call to a destination, and any further communication with the TCCP, as will be further described hereinbelow.

It is understood, that the system described in FIG. 1 is merely illustrative of a prior art system which may be readily adapted for practicing the present invention, and that not all of the signaling and information processing described in connection with FIG. 1 is required for practicing the present invention. As a practical matter, however, such information may be useful for providing improved methods for call handling and party assignment, or may be essential for the system to implement prior art methods of ACD as an adjunct to the present invention. For example, the ACD system disclosed in the above-referenced patent to Brown may be used for overall system management by providing for changes in the call processing logic within IXC network 103 and in staffing at various splits, while the present invention provides for real-time ACD on a call-by-call basis, as will be further understood by the ensuing description. It will be understood, however, that the present invention provides an independent and complete system for call distribution that does not require ancillary or associate call distribution systems.

Figure 2:
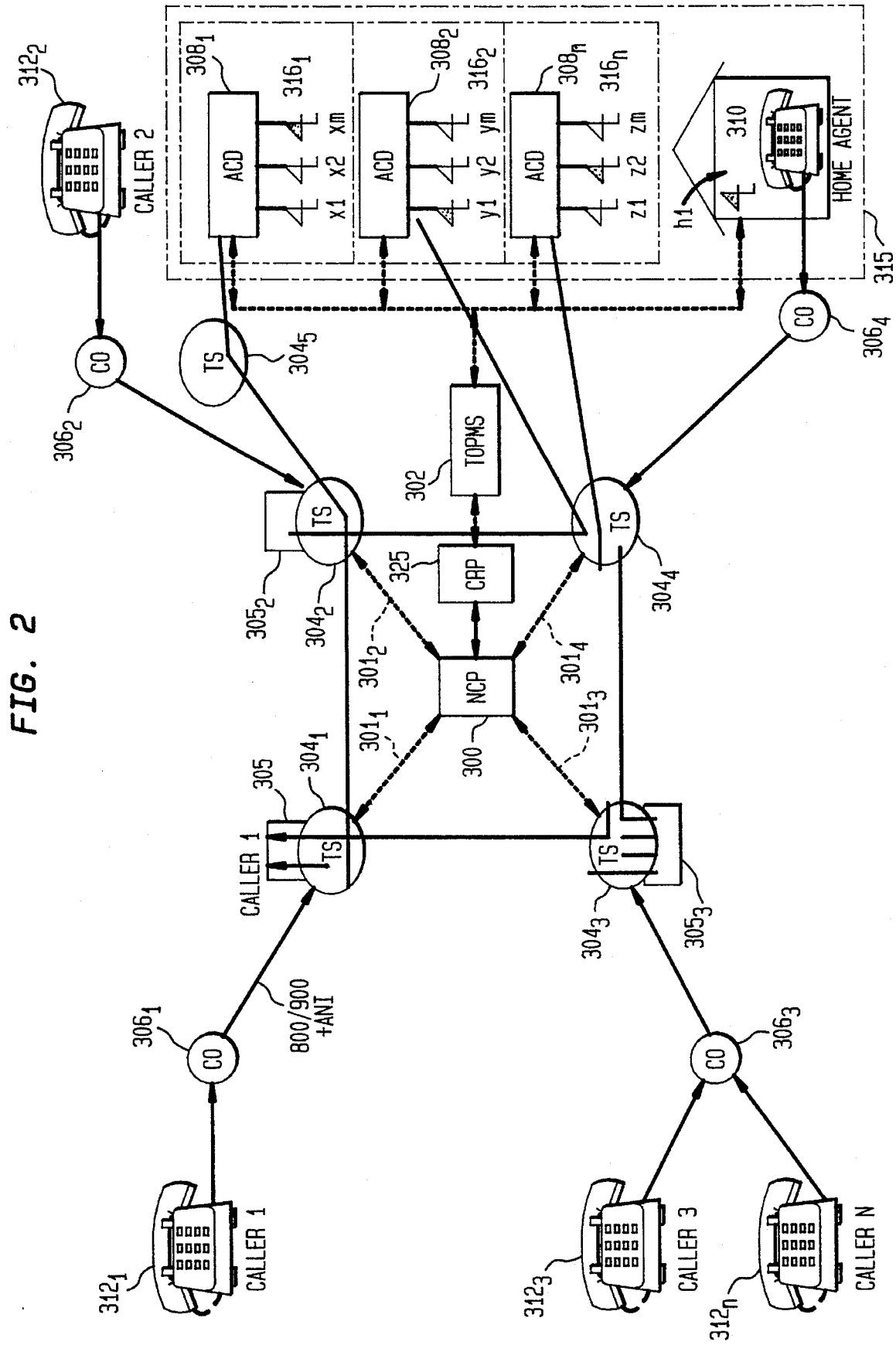
FIG. 2 depicts, in simplified form, an exemplary telephone network embodying the principles of the present invention.

The present invention will further be understood in accordance with an embodiment depicted in FIG. 2. Shown is the schematic relationship between calling stations $312_1$, $312_2$, $312_3$, $312_n$, LEC central offices (CO) $306_1$, $306_2$, $306_3$, $306_4$, network toll switches (TS) $304_1$, $304_2$, $304_3$, $304_4$, $304_5$, network control point (NCP) 300, call management system 302, Customer Routing Point (CRP) 325, and telemarketing complex 315.

The telemarketing complex 315 of the present embodiment includes a plurality of telecommunications centers (TCs) $316_1$, $316_2$, $316_n$, as well as home agent location 310. Typically, each of the TCs includes at least one ACD, and one or more split gates, each split comprising a group of agent terminals. TC $316_1$ includes ACD $308_1$, to which are connected a plurality of agent terminals x1, x2, xm. TC $316_2$ includes ACD $308_2$, to which are connected a plurality of agent terminals y1, y2, ym. TC $316_n$ includes ACD $308_n$, to which are connected a plurality of agent terminals z1, z2, zm. Also, home agent location 310 includes agent terminal h1.

The TSs are stored-program control switches, such as the 4ESS or the 5ESS switch, and as shown, toll switches $304_1$, $304_2$, and $304_3$, preferably are connected to adjunct processors (AP) $305_1$, $305_2$, and $305_3$, respectively. Such switching machines are well known and contain the service logic required to intercept calls which require special handling by the network, and to send queries to the network. The APs preferably provide functions such as receiving and temporarily suspending (e.g., "parking") a call (e.g., at a port), routing a parked call to its destination, and may also include a means for voice band prompting, such as an audio response unit which receives multifrequency tone (e.g., DTMF) entries from the calling party, and issues voice messages that elicit these tone responses.

NCP 300 communicates to TS $304_1$, TS $304_2$, TS $304_3$, and TS $304_4$ via bidirectional data links $301_1$, $301_2$, $301_3$, and $301_4$ (e.g., SS7). The function and operation of NCPs is well known in the art. In addition, the NCP is connected to CRP 325, which is connected to call management system 302, which includes a telemarketing operations and planning management system (TOPMS), also referred to as a premises-based telemarketing agent management system (and also referred to in FIG. 1 as a TCCP). The CRP 325 may be implemented on the customer premises or at locations within the network. The call management system 302 is connected via a bidirectional data link to telecommunications complex 315, and particularly to each of the ACDs and preferably also to home agent location 310, for receiving status information therefrom and providing control signals thereto.

As may be appreciated, and as discussed above, the foregoing descriptions of network architectures which include connection to an ACD for routing of calls to a TC provide examples of systems that one skilled in the art may adapt to implement an ACD method and system in accordance with the present invention.

In accordance with the present invention, it is understood that call load management occurs on a call-by-call basis, according to centralized queue control managed by the CRP in accordance with information received from the TOPMS with calls being queued at ACDs.

Figure 3:
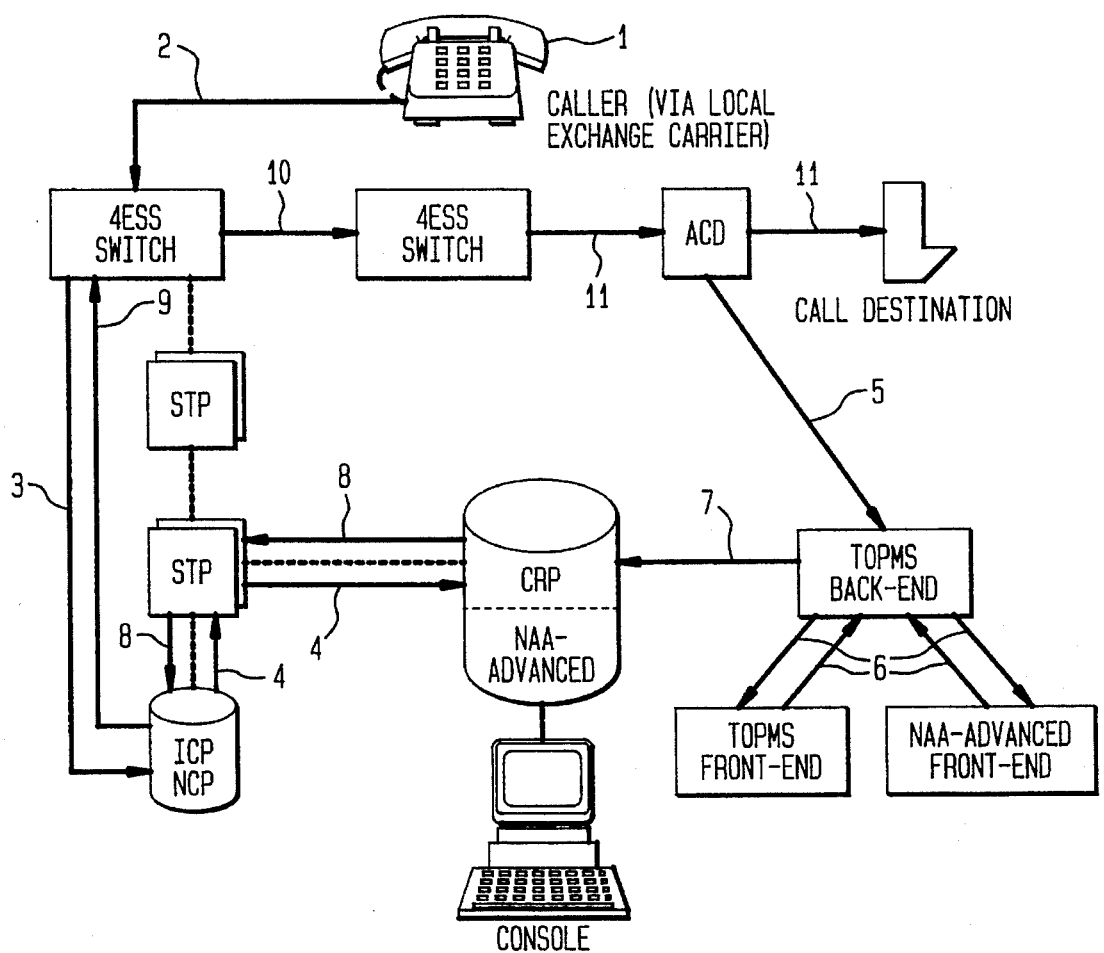
FIG. 3 illustrates, in simplified form, an operational signal flow of an exemplary process of practicing the present invention in a network analogous to that of FIG. 2.

Referring generally to FIG. 2 and FIG. 3, in accordance with present invention, a system and methodology of which is hereinbelow referred to as "The Next Available Agent (NAA) Application", enables 800-service customers to control the routing of calls to their terminations via a Customer Routing Point (CRP). This control is based on periodic updates of the status of each site obtained by a Telemarketing Operations Performance Management System (TOPMS) in an Intelligent Call Processing Environment (ICP).

NAA uses the ICP platform capability to temporarily suspend the 800 call processing in the AT&T Network Control Point (NCP), and query the CRP to get routing information before resuming call processing. The ICP architecture is achieved by providing an application-level interface between the NCP and the CRP. TOPMS provides a centralized monitoring and alerting system for customer's geographically dispersed Automatic Call Distributors (ACDs). Each of the ACDs terminates one or more 800 numbers and supports one or more applications. Agents answer the incoming calls and provide the service defined by the application. TOPMS periodically collects performance data and status information and passes it to NAA. The NAA uses periodic updates on ACD performance data to distribute calls efficiently to multiple customer sites. It employs a method to provide the "optimal" routing label for each call that queries the CRP.

For an embodiment of the NAA system, a CRP-based method is implemented. This methodology requires that the NAA software reside in the CRP allowing for dynamic routing decisions in the CRP at each call arrival point (even between TOPMS' updates) and not requiring that the updates be synchronized in any way. This gives more flexibility in responding to different customer needs such as:

Geographic preferences and constraints

Least cost preferences

Performance thresholds

Different performance objectives.

In this ensuing description, an embodiment of the method and system design for dynamic customized routing in the CRP is described. In accordance with this embodiment, a table-based customized routing method is employed and incorporated into a CRP-based load balancing method developed for the NAA. The tables can easily accommodate a wide range of routing preferences and by simply changing the entries in the tables the same method can be tailored to different customer applications. Routing policies requested by the customers can be easily converted into table entries and the table-based scheme allows for easy specification of the routing decisions desired by the customers. It is a robust scheme in that an improperly specified rule or a set of conflicting routing decisions do not cause system problems but only result in suboptimal routing.

The foregoing overview may be further understood in view of the ensuing description which is structured as follows: first, an operational description of practicing the invention in accordance with a network such as the one shown in FIG. 2 is provided; then a basic system design is described; in connection with this design, an example is provided; then, in accordance with an embodiment of the present invention, a schematic description is provided of how two tables can be used to input a customer specified routing policy; then the method description and details are provided.

Referring now to FIG. 3, and with reference to FIG. 2, as described above, in accordance with practicing the present invention, NAA-Advanced (which generally refers to an embodiment of customized dynamic routing in accordance with the present invention) receives Automatic Call Distributor (ACD) performance measures from TOPMS. TOPMS monitors the call traffic at each Automatic Call Distributor (ACD) location, collecting near-real-time status and performance data concerning the traffic conditions. NAA-Advanced uses performance measures such as:

the number of agents at each site the number of calls in queue the number of calls in progress When TOPMS receives the performance data, it sends these updates to NAA-Advance. Based on these updates, NAA-Advanced predicts each site's status for each call arrival. Then, the call is routed to the best possible site within the customer-specified routing options.

Referring further to FIG. 3, the NAA-Advanced call flow according to the present invention, is further described. It is understood that in order to facilitate an operational flow description, FIG. 3 provides a simplified view of a network, and the related components, such as those shown in FIGS. 1 and 2. The numbers shown in FIG. 3 correspond to the numbered steps hereinbelow, and in effect, provide the basis for a flow chart according to the steps involved in practicing the present invention and to the related signaling implemented in networks such as those represented by FIGS. 1 and 2. In conjunction with the operational steps that are described with respect to FIG. 3, for some of these steps the signaling is also further described with reference to FIG. 2 to provide additional information.

In step 1, the caller dials an 800 number assigned to an ICP/NAA-Advanced customer. Referring to FIG. 2, for example, calling station 312, places a call, dialing a number for connection to an agent associated with telemarketing complex 3 15. As understood with respect to such telemarketing systems, the dialed number does not uniquely identify a particular agent, and typically more than one number is available for accessing telemarketing complex 315. A unique 800 number or special access code may be assigned to a particular campaign or service, or each 800 number may be used for a variety of such telemarketing applications.

In step 2, the call reaches an AT&T Number Electronic Switching Systems switch (e.g., 4ESS™ or 5ESS™), which determines if ICP/NAA-Advanced call treating is necessary. Again, referring to FIG. 2, based on the number dialed (e.g., an 800 or 900 number), CO $306_1$ recognizes the call as one for special handling and routes the call to network TS $304_1$ using either in-band or out-of-band signaling, providing the caller ANI, and the dialed number to the network. Handling of 800 numbers by LEC networks and long distance networks is well known in the art. As stated, TS $304_1$ then determines if ICP/NAA-Advanced call treating is necessary for this call.

In step 3, the 4ESS switch passes the following information to the ICP NCP:

caller's telephone number, referred to as the Automatic Number Identification (ANI), if available, or the originating area code, referred to as the originating Numbering Plan Area (NPA), or both; and dialed 800 number With reference to FIG. 2, upon receiving the call, the TS $304_1$ launches a query to NCP 300, providing the ANI (and/or NPA) and dialed 800 number. Based on this information, the NCP instructs the TS $304_1$ to hold (e.g., park) the call, also referred to herein as temporarily suspending the call. Preferably, this call suspension is implemented in accordance with the ICP platform, which is described in U.S. Pat. No. 5,311,572 to A. Friedes et al. In compliance with this instruction, the TS $304_1$ assigns the call to a port at AP $305_1$, and provides NCP 300 with the assigned port address. It is understood, however, that in certain instances it may be preferable or advantageous for NCP 300, in response to an initial query from a TS, to route the call for parking at another TS.

In step 4, the ICP NCP determines, based on stored customer-specific information, whether to prompt the caller for Caller-Entered Digits (CED). Then, it does one of the following:

If the caller is prompted for CED, the ICP NCP collects the caller's response and sends a query to the CRP through AT&T STPs. The query contains the ANI (if available) and/or the originating NPA, the dialed 800 number, and the CED.

If the caller is not prompted for CEDs, the ICP NCP sends a query to the CRP with the ANI (if available) and/or originating NPA, and the dialed 800 number.

In step 5, independently, the TOPMS back-end periodically monitors the call traffic at the ACDs. That is, it is understood that this monitoring occurs over time and thus step 5 is not defined according to a specific order with respect to the other steps.

In step 6, the TOPMS back-end collects the ACD data and the information (e.g. customer priorities) that the customer entered at the TOPMS and NAA-Advanced front-ends. As for step 5, there is no particular time relationship for step 6 with respect to the other steps.

In step 7, the TOPMS back-end reports this collection of data (i.e., ACD related data) to the CRP. Again, as for step 5 and step 6, there is no particular time relationship for step 7 with respect to the other steps. That is, these steps (i.e., step 5–7) are enumerated for the convenience of describing with reference to FIG. 3 the steps that are included within a preferred embodiment of practicing the present invention.

In step 8, the CRP processes the data and returns a response message, referred to as a routing label, to the ICP NCP via the AT&T STP. This routing label describes the desired final disposition for the call. (For security purposes, preferably the AT&T STP performs gateway screening to ensure that the message from the CRP is allowed). Referring to FIG. 2, the CRP 325, based on the signal received from NCP 300, and according to the status information received from the call management system 302 (i.e., TOPMS) appropriately assigns an ACD. For instance, based on the dialed number (e.g., which may indicate a particular campaign), the location of the caller as indicated by the ANI and/or NPA (numbering plan area, also known as Area Code), the availability of agents for a particular campaign, and the load being handled by the respective ACDs, the CRP determines an optimum agent site for handling the call. The method and system according to the present invention for assigning an ACD according to ACD status information provided by the TOPMS is further described below.

In step 9, using information from the CRP, the ICP NCP sends routing and billing information to the originating 4ESS switch. Again, with reference to FIG. 2, for the example of caller $312_1$, the CRP 325 determines that the appropriate ACD for assigning to the incoming call is ACD $308_n$, and sends the related routing information to TS $304_1$ via NCP 300 (e.g., via STPs associated therewith, which are not shown per se, but are implicit to the network of FIG. 2 as schematically depicted).

In step 10, the originating 4ESS switch takes steps to route the call to a terminating 4ESS switch. It may be understood that in certain circumstances, the originating 4ESS switch may also be the terminating 4ESS switch. In the example described in connection with FIG. 2, the terminating switch is represented by TS $304_4$ to which, as shown, ACD $308_n$ is connected. In the example, a connection is established between TS $304_1$ and TS $304_4$ via either TS $304_2$ or TS $304_3$.

In step 11, the call passes from the terminating 4ESS switch to the ACD and on to its destination. When the call is established, the billing recording process begins.

Routing Strategy

Figure 4:
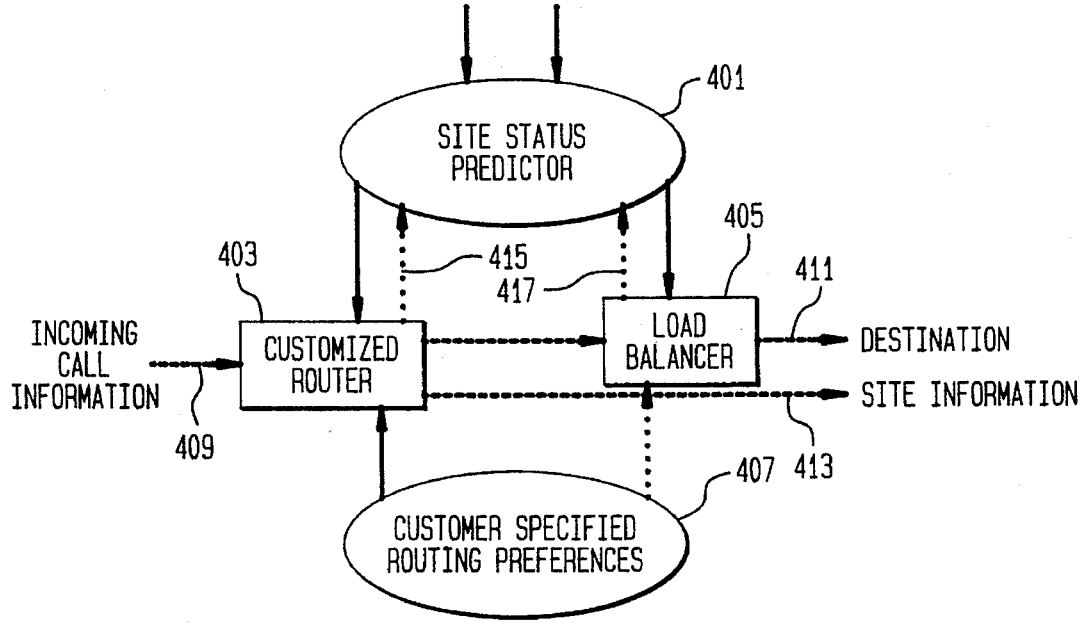
FIG. 4 functionally illustrates a routing function divided into two functional parts, in accordance with an embodiment of the present invention.

In accordance with the present invention, the basic system design preferably provides that the routing function is implemented in the CRP and is divided into two parts, as shown in FIG. 4. That is, FIG. 4 illustrates the dataflow associated with the routing function performed by the CRP 325. Site Status Predictor 401 generates a status prediction for the ACD(s) based on periodic updates from ACD sites, and provides the status prediction to Customized Router 403 and to Load Balancer 405. Customer Specified Routing Preference 407 (including thresholds and/or site conditions) are also provided to Customized Router 403 and Load Balancer 405. Customized Router 403 receives incoming call information 409 (e.g., caller entered digits, dialed number, ANI, etc.) and Customer Specified Routing Preference 407 information, and determines a destination ACD site base on a function of these parameters. If a destination ACD cannot be determined, Load Balancer 405 determines a "best" destination ACD across all ACD sites. The destination ACD information is provided on dataflow lines 411 and 413 for use by the network in routing the call. After the routing function has determined the destination ACD, the Site Status Predictor 401 is updated with the information related to the determined destination ACD, as indicated by dataflow lines and 417.

In accordance with the dataflow example of FIG. 4 additional features may be implemented therewith. As indicated, an incoming call passes first through the Customized Router (CR). The Customized Router uses a (Custom Routing) Preference Table to make routing decisions. Entries in this table specify for each call origination an ordered list of preferred destinations and conditions that need to be satisfied to allow routing of the call to each destination. The CR searches the Preference Table and makes a routing decision on a First-Match basis. That is, the first entry in the table with which there is a match (i.e., the specified condition is satisfied) will be used. The first-match option allows the customer to specify a hierarchy of routing decisions (based on geographic preferences and/or least cost preferences and performance thresholds) to be followed in the order specified. If no match is found, then the call will be sent through to the Load Balancer (LB) to be routed to the site which would best balance the load and minimize overall delays. The LB will use a table of site-specific eligibility conditions which will determine which of the sites is eligible to receive calls routed by the LB. Both the CR and the LB can use site status predictions based on, for example, expected queue sizes and delays at the sites provided by the Site Status Predictor (SSP). These predictions will be based on periodic updates from the sites. Finally, there will be a default routing specification. This would specify one destination site for each origination region. The default will be used if both the CR and LB are unable to route the call because there is no match with the custom routing decisions and there is no site eligible for load balancing. The default routing might include termination treatment (announcement or busy tone or post feature interaction).

The CR can also balance the load since it routes the call to a preferred destination only if the condition specified for this destination is satisfied. For example, this condition could be that the expected delay is below a specified threshold. The main difference between the CR and LB is that in the CR the routing destination is chosen by evaluating the status (i.e., expected delay) of one destination against the specified condition. The LB, on the other hand, evaluates the status of each eligible destination and chooses an optimal decision based on a specified objective. We expect that the LB function for most customers would be to minimize expected delay. However, the system design can easily allow a different objective function (e.g. maximize expected profit) and a modified CRP-based method.

Example of Addressing a Hypothetical Customer's Requirements

Figures 5, 6, 7:
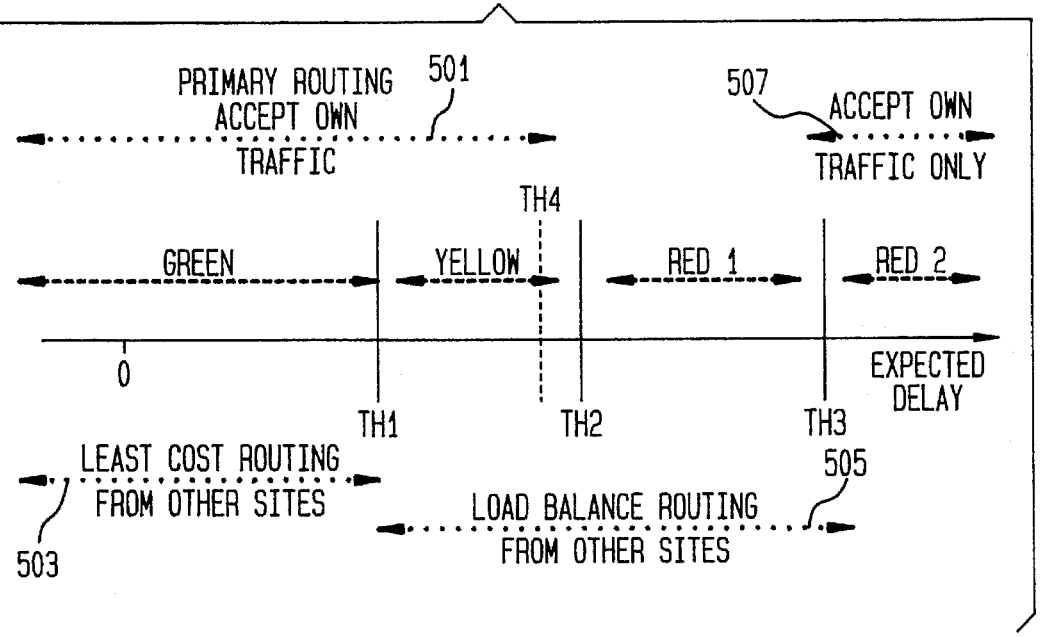
FIG. 5 schematically illustrates an example of customer specified routing requirements and the use of predicted expected delay and delay thresholds for site status, in accordance with an embodiment of the present invention.
FIG. 6 illustrates, by way of example, a Preference Table that contains the conditions which need to be satisfied for customized routing, in accordance with an embodiment of the present invention.
FIG. 7 illustrates, by way of example, an Eligibility Table for use in customized routing, in accordance with an embodiment of the present invention.

Using the basic concepts of the previous section, this section describes by way of example the type of routing policy that may be used based on a hypothetical customer's requirements. Assume the customer would like to utilize a routing method which maintains their Primary Area Code configuration such that there is a Primary destination site associated with each call based on its origination area code. Call routing decisions to the Primary destination site or to alternate sites may be made based on least cost routing preferences, expected delays, and customer specified thresholds. Based on these and other requirements, each customer site, depending on the number of calls in progress, the number of available agents and customer specified thresholds, can be in one of four states—Green, Yellow or Red 1, and Red 2, as illustrated in FIG. 5, which shows an expected delay time line divided into site states based on the customer-specified thresholds TH1, TH2, TH3, and TH4. Furthermore, these site states determine routing zones 501, 503, 505, 507, which are illustrated by the bidirectional arrows in FIG. 5.

An originating call is to be routed on a first-match basis in hierarchical order (a) to (d):

(a) To a Green or Yellow Primary destination site (indicated by Primary routing zone 501)

(b) To the first Green secondary destination site with the secondary destinations specified in least-cost order (indicated by routing zone 503)

(c) To a (Yellow or Red 1) site with the smallest expected delay (indicated by Primary routing zone 501).

(d) To the Primary destination site (indicated by routing zone 507).

Here, condition (b) is evaluated only if (a) is not satisfied, and it implicitly assumes that the Primary site status is Red. Condition (c) is evaluated if both (a) and (b) are not satisfied, and it implicitly assumes that the Primary site status is Red and secondary site status is Yellow or Red. Similarly, condition (d) assumes that (a), (b) and (c) are not satisfied. Condition (d) is used only if all sites are Red 2 and is the default condition.

The site status Green, Yellow, Red is determined based on predicted expected delay and delay thresholds, as illustrated in FIG. 5. In addition, once a site enters Red 2, it leaves Red 2 only if the delay falls below a low threshold TH4. Note that the status Red 2 is defined differently than the others. Once the site enters the state Red 2, it will remain Red 2 until its predicted expected delay goes below the threshold TH4. This can be accomplished by either remembering the last site status or by having a flag with two values ON and OFF. When the site status becomes Red 2, this indicator is set to ON. Once the indicator is ON, the status of the site remains Red 2 until its predicted expected delay drops below TH4. When this happens, the indicator is reset to OFF and the site status is once again determined by the thresholds TH1, TH2 and/or TH3. Thus, at each call arrival point at the CRP, different conditions are used to evaluate the site status if the site flag is found in ON or OFF state. For example, the thresholds setting in FIG. 5 and the flag indicator in OFF state, defines the site status as Green, Yellow, Red 1 or Red 2 if its predicted delay is respectively below the TH1, between the TH1 and TH2, between the TH2 and TH3 and above the TH3. If the site flag is in ON state, the thresholds setting in FIG. 5 determines the site status as Red 2 if its predicted delay is above the TH4, Yellow if its predicted delay is between the TH1 and TH4 and Green if its predicted delay is below the TH1.

Tables for Customer Specified Routing Policy

This section schematically describes how, in accordance with a preferred embodiment of the present invention, two tables may be used to input a customer specified routing policy. The Preference Table (e.g., FIG. 6) is a table that contains the conditions which need to be satisfied for customized routing. This table will be searched on a first-match basis, i.e., not all entries in the table need to be searched through at each call arrival. Only if no-match is found will the Eligibility Table (e.g., FIG. 7) be referred to. All entries in the Eligibility Table will be used. A convention can be advised under which a site is always available or not available for load balancing. Both tables, in general, could have the following keys: origination region, site id, and a list of conditions. The conditions could be regarding queue sizes, delays, time periods, etc. Both tables could be sorted by any of the keys to simplify the search for a match.

We now describe how our table-based system can be tailored for the foregoing hypothetical customer. The Preference Table will have the entries shown in FIG. 6. Thus, if there is a call origination from the Region 1 and its Primary destination site 1 is in status Green or Yellow (i.e., its predicted expected delay$\leq$TH2) then there will be a match with the first entry and the call will be routed to site 1. This entry corresponds to condition (a). If the predicted delay for the site 1 is above the TH2 value, then there will not be a match and the next entry in the table is checked. If the predicted status of site 3 is Green (i.e., its predicted delay$\leq$TH1), then a match is found and the call will be routed to site 3. If the predicted delay for site 3 is above TH1 value, there will not be a match and the next entry in the table is checked. The list of sites (3, 4, 5, 2, . . . ) is in least cost order and corresponds to condition Co). If the last entry for region 1 in the table is reached without a match, the result is the no-match condition, and the call is routed through to the load balancer. The load balancer will decide which sites are eligible for load balancing based on an Eligibility Table, which is shown in FIG. 7. The eligibility table takes condition (c) into account. Condition (c) means that the call is routed to the Yellow or Red 1 site having the smallest expected delay; that is, a site in Red 2 condition is not eligible to receive calls via the Load balancer. If no site is eligible for load balancing, the default option is to be used. This default for the hypothetical customer is to route to the Primary destination and corresponds to condition (d).

These two tables along with the default rule properly implement the routing policy desired by the hypothetical customer. It is important to note that the first-match option picks the first entry and, thus, allows the customer to develop a hierarchy of routing decisions to be considered in progressive order. The hypothetical customer's Eligibility Table for NAA application preferably lists all sites under the Site Id field that are potential candidates for load balancing. A more general Eligibility Table might need to have a Call Origination field to allow load balancing over a subset of sites for calls originating within a certain region.

It may be appreciated that the described routing method and system features flexibility in addressing diverse customer needs in a systematic manner. At each call arrival point, sites can be evaluated and placed into one of the following states Green, Yellow, Red 1 or Red 2. This site evaluation is based on the number of calls in queue, number of available agents, average handling time and customer specified thresholds.

As discussed, a general routing strategy that a customer can choose via user interface will route the call in the following hierarchical order (i)–(iv):

i. To a Green or Yellow Primary destination;

ii. To the first Green alternate destination, where alternate destinations are specified according to customer preferences (e.g., least-cost, or other priorities/constraints);

iii. to a Yellow or Red 1 site with the smallest expected delay;

iv. to a destination specified by Default routing (might be Primary destination, announcement or busy signal).

Note that this particular policy controls is via threshold values trade-off between, say, routing costs and abandonment. A diverse set of routing policies may be obtained by setting threshold values appropriately. Other important routing options that may be obtained in such a manner include:

Load Balancing, i.e., muting option which maximizes call completion by routing each call to a site with the smallest expected delay.

Primary destination followed by Load Balancing, i.e., route a call to its Primary destination if its current delay is below certain threshold. Otherwise, load balance, i.e., choose the best site across all sites.

Load Balancing followed by Special Treatment, i.e., load balance across all Yellow or Red 1 sites. However, if a site is in Red 2 state, the site is not eligible to accept calls. If all sites are in Red 2 state, use Default option.

Primary destination followed by Alternative Destination followed by Load Balancing.

Primary Destination followed by Alternate, followed by Load Balancing followed by Load Balancing followed by Special Treatment.

It is understood that the present invention may be practiced and implemented to include customer specified caller classes which thus provides for class dependent routing policy. It may be appreciated, however, that there are myriad explicit performance objectives that may be included in practicing the present invention.

Site Status

The CRP-based method for NAA application is based on the site status prediction (e.g., the queue lengths and delays) of various sites at each call arrival point. One way of determining the site status is based on queue length and delays. These predictions are based on periodic updates from each site. The Data Collection and Processing Module TOPMS collects the updates on the status of each site. For each site j, (j=1, 2, . . . N), these updates contain ACD performance data on the following:.

Number of agents available at site j ($s_j$);

Number of calls in progress at site j ($x_j$);

Average handling time at site j ($AHT_j$);

Cumulative number of calls offers ($CNCO_j$);

TOPMS sends this information periodically to the CRP. The CRP uses this information to estimate the following input parameters for the next period:

1. service rate $\mu_j$ (based on $AHT_j$), and
2. non-NAA arrival rate $\lambda_j$ for site $j$ (based on the $CNCO_j$ and the CRP count on the number of NAA calls routed to a site j in the last interval).

Thus, at each TOPMS update, the parameters $x_j$, $s_j$, $\lambda_j$, and $\mu_j$ will be used as a basis for predicting the status of each site j during the upcoming interval.

Both, the CR and LB require queue size and delay predictions at the time of call arrivals. Queue size is determined by the number of calls in progress and the number of agents available at a site, and it is a crucial component of estimating delays. However, between any two successive TOPMS updates, the number of agents in our calculations do not change, and the queue size is changed by predicting the number of calls in progress. In the following, predictions on the number of calls in progress are sometimes referred to as queue size predictions.

Let the queue sizes/delays be last predicted/observed at time t and be equal to $x_j$ and $d_j$, respectively, at site j. If predicted, the queue size and delay values are estimates. If observed, the queue size values are actual values. The same variable is used for both purposes and the only requirement is that the time of the last update be maintained.

Site Status Predictions: Let an incoming call arrive at time $t_1$ and let $\Delta t = t_1 - t$ be the time since the last update.

At this time we predict the number of calls in progress for each site j in the following way:

$$x_j^{new} = \begin{cases} x_j + \lambda_j^p \Delta t - s_j \mu_j \Delta t & \text{if } s_j < x_j \\ x_j + \lambda_j^p \Delta t - x_j \mu_j \Delta t & \text{if } s_j \geq x_j \end{cases} \quad (1)$$

Here, the predicted number of calls in progress is made equal to zero if it turns out to be negative, i.e., $$x_j = max(x_j^{new}, 0) \; j=1,2 \ldots, N. \quad (2)$$

The predicted delay at site j is given by $$d_j = \frac{x_j - s_j + 1}{s_j \mu_j}$$

and the site status is determined by comparing this delay against the appropriate threshold(s). If there is no match with the conditions specified in Preference Table, the LB will route the call to an eligible site with the smallest predicted delay if the LB objective is to minimize the expected delay (see Comment 1 in Section 1). Delays are allowed to be negative to indirectly balance the site occupancy when queues at some sites are empty and there are idle agents available.

Once the call is routed to a site, the site's predicted number of calls in progress is incremented by 1.

Let the next call arrive at time $t_2$. Now, the routing decision is made by the same process based on queue/delay prediction made for each site with $\Delta t = t_2 - t_1$.

Note that by allowing that the time since the last update varies from site to site, i.e., $\Delta t$ may depend on a site j and be replaced by $\Delta t_j$ in equation (1), the method becomes robust in the sense that it does not require synchronized updates from all sites and allows different update frequency from different ACD's. Thus, by way of example, the system can easily handle a hypothetical case in which the TOPMS receives updates from twelve sites every 30–32 seconds and from two sites every 15 seconds.

Methods to Estimate the Input Parameters

Preferably, in accordance with the present invention, TOPMS provides the NAA periodically with the following data from each ACD (site i):

$PPM_i$ Primary Positions Manned (PPM), i.e., number of agents available at site i;

$NCO_i$ Number of Calls Offered provides a snapshot of the number of calls in progress at site i, i.e., the number of calls in queue and calls being served;

$AHT_i$ Average Handling Time per call for site i;

$CNCO_i$ Cumulative Number of Calls Offered at site i.

The first two measures, $PPM_i$ and $NCO_i$, represent an instantaneous view for each site i, i=1, 2, . . . N. The last two are cumulative measures over a time interval designated by the customer. In addition, if the customer has subscribed to 800 Data Collection Services (DCS), TOPMS will collect call attempt data from the customer's DCS workstation. Let $DCS_i$ denote a count on the total 800-call attempt data sent to a size i.

The main difference between $CNCO_i$ and $DCS_i$ is that

CNCO$_i$ value includes the local (non-800) traffic, but excludes calls that were blocked;

DCS$_i$ value indicates the calls that were blocked, but excludes the local traffic.

To get the estimates for the non-NAA network arrival rate $\lambda_{io}$ in the situation when the NAA routes a portion of the total traffic that is to be distributed to multiple customer sites, we need periodic updates of the number of total calls sent to each site by the NAA. Let CRP$_i$ denote a total count of the NAA call attempts sent to a site i. CRP$_i$ can be obtained by keeping a count on the CRP of calls routed to each site and passing this information back to the NAA. CRP$_i$ data on call attempts also include the number of calls that were blocked, but exclude the local (non-800) traffic.

Time Stamps: In addition to the data defined, a time stamp is given to the data received from the ACDs, DCS and CRP.

Estimating $s_i$ and $x_i$: The updates of PPM$_i$ and NCO$_i$ for each i translate to respective parameters $s_i$ and $x_i$.

The new estimates for the service rate $\mu_i$ and non-NAA arrival rate $\lambda_{io}$ for each site i for the next t-second update interval rate are obtained by using the observed values in the last interval and performing the exponential smoothing with the old estimate:

Estimating $\mu_i$: We use periodic observed values of AHT$_i$, to obtain the estimates of the departure rate for that size, i.e., $\mu_i$(observed):

$$\mu_i \text{ (observed)} = \frac{1}{AHT_i} \quad (4)$$

$$i = 1, 2, \ldots, N$$

The estimate of $\mu_i$ for the next interval (denoted by $\mu_i$) is obtained as a convex combination of the $\mu_i$(observed) and the last estimate $\mu_i$(old):

$$\hat{\mu}+ee_i = \alpha+e, \text{cir } \mu_i(\text{observed})+(1-\alpha)\mu_i(\text{old}), \leq \alpha \leq 1 \quad (5)$$

Estimating non-NAA arrival rate $\lambda_i^o$

The general idea of obtaining the new estimates for the upcoming interval is the same: Observe the values in the last interval and perform exponential smoothing with the value of the old estimate.

In the case when the NAA has control of only part of the total traffic, the non-NAA call arrival rate has to be estimated from the measurements of the observed total number of calls at each site i and the CRP$_i$ value, where these two measurements are not synchronized. It is not clear how much the lack of synchronization affects the choice of parameters. Based on a previous study, this effect is not expected to be significant.

We propose the following procedures for estimating the non-NAA arrival rate $\zeta_i^o$.

Let $\lambda_i^{tot}$ denote the total network arrival rate forecast (call/sec) to a site i;

$\lambda_i^{NAA}$ denote the NAA arrival rate forecast (calls/see) to a site i;

$\lambda_i^o$ denote the non-NAA arrival rate forecast (calls/see) to a site i;

$\Delta$CRP$_i$ denote the number of NAA call attempts sent in the last interval to a site i. A CRP$_i$ is obtained as a difference between the two last consecutive CRP$_i$ values;

$t_{CRP}$ denote the length of the last update interval for NACD call attempts, $t_{CRP}$ is obtained as the difference (sees) between the time stamps of the last two consecutive CRP measurements;

$\Delta$CNCO$_i$ denote the number of calls received at a site i in the last interval. $\Delta$CNCO$_i$ is obtained as a difference between the last two consecutive CNCO$_i$ values;

$t_{ACD}$ denote the length of the last update interval over which $\Delta$CNCO$_i$ value is accumulated, i.e., $t_{ACD}$ is obtained as a difference between the time stamps of the last two consecutive CNCO$_i$ values;

$\Delta$DCS$_i$ denote the total number of 800-call network attempts sent to a site i in the last interval. $\Delta$DCS$_i$ is obtained as a difference between the last two consecutive DCS$_i$ values;

$t_{DCS}$ denote the length of the last update interval over which the total network call attempt data is accumulated.

To obtain the new estimate for the non-NAA arrival rate $\lambda_i^o$, we consider the following approach:

1. Evaluated the new estimate for the total arrival rate forecast $\lambda_i^{tot}$ for each site i for the upcoming interval The new estimate, denoted by $\lambda_i^{tot}$, is obtained as $$\hat{\lambda}_i^{tot} = \beta \lambda_i^{tot}(\text{observed})+(1-\beta)\hat{\lambda}_i^{tot}(\text{old}), \quad 0 \leq \beta \leq 1 \quad (6)$$

where $\lambda^{NAA}$(observed) is based on the $\Delta$CNCO$_1$ value or $\Delta$DCS$_1$ value, i.e., $$\lambda_i^{tot} \text{ (observed)} = \frac{\Delta CNDO_i}{t_{ACD}} \text{ or } \frac{\Delta DCS_i}{t_{DCS}} . \quad (7)$$

2. Evaluate the new estimate for $\lambda_i^{NAA}$, the NAA arrival rate for the site i.

The new estimate, denoted by $\lambda_i^{NAA}$, is obtained as:

$$\hat{\lambda}_i^{NAA} = \gamma \lambda i^{NAA}(\text{observed})+(1-\gamma)\hat{\lambda}_i^{NAA} \text{ (old)}, \quad 0 \leq \gamma \leq 1 \quad (8)$$

where $\lambda^{NAA}$(observed) is based on the CRP$_i$ value, i.e., $$\lambda_i^{NAA} \text{ (observed)} = \frac{\Delta CRP^i}{t_{CRP}} . \quad (9)$$

3. The new estimate for $\lambda_i^o$, the non-NAA arrival rate for each site i in the upcoming interval is obtained as a difference between the total arrival rate and the NAA arrival rate at site i:

$$\lambda_i^o = \max(\hat{\lambda}_i^{tot} - \hat{\lambda}_i^{NAA}, 0) \quad (10)$$

Equation (6) based on CNCO$_i$ value is more suitable if there is a significant amount of local traffic.

Equation (6) based on DSC$_i$ value is more accurate for sites without local traffic.

Note, by way of example, that for some applications, the data related to these measures accumulate over 30 minute intervals and the ACD resets these measures at the end of time intervals. In such a case, we do not have exactly CNCO i, and we will use DCS data that will give us network attempts every 3 minutes. However, as a back up, we will obtain ACD data on a number of calls handled (NCH) at each site which is a cumulative measure of call completions, i.e., it does not include calls that have abandoned the queue. Thus, approximation for $\Delta$CNCO$_i$ is given by $$\Delta CNC\ 0_i = NCH_i(\text{current}) + NCO_i(\text{current}) \ [NCH_i(\text{last}) + NCO_i(\text{last})]$$

Smoothing Factor: The value of the smoothing factor value $\alpha$, $\beta$ and $\gamma$ in equations (5), (6) and (8) respectively, will depend on the time interval for these updates. A time interval on the order of a few minutes might require a smoothing factor closer to 1, to give more weight to the current observed value. A smaller positive smoothing factor value is to be used with a smaller interval to give more weight to the past observations. We recommend the initial smoothing factor of at least 0.95 for the time of the order of three minutes, 0.2 for the time interval of 15 seconds and 0.3 for the time interval of 30 seconds. These initial estimates can be further "tuned" through simulation analysis (time permitting) or, if necessary, during a trial.

Initialization of the Method: In accordance with an embodiment of the present invention, initial starting values may be based on customer's data for the average handling time for each site, total arrival rate and NAA arrival ram (calls/sec) for each site, to start performing exponential smoothing for each site.

It may be appreciated, therefore, that the present invention includes many features and advantages. For example, the present invention accounts for local and other inbound traffic (routed to each site via some other NCP based routing decisions). Further, the present invention provides for flexibility in addressing diverse customer needs in a systematic manner. At each call arrival point, site can be evaluated and placed into one of the following states Green, Yellow, Red 1 or Red 2. This site evaluation is based on the number of calls in queue, number of available agents, average handling time and customer specified thresholds.

It provides a customized routing method that offers flexibility to address diverse customer needs such as geographic preferences and constraints, least cost preferences, performance thresholds and performance objectives.

Some of the strengths of this method include the following:

1. It makes call-by-call routing decisions by being able to predict the status of multiple customer sites at each call arrival. These queue/delay predictions, based on periodic updates of the status of each site, take into account.

local traffic and other inbound traffic routed to each site via some other NCP based routing features;

call completions in between updates.

The method has demonstrated extremely good performance even when it controls less than 50% of the total traffic.

2. The method does not require the updates from different ACDs to be synchronized or at the same frequency to provide good performance (cost savings).

3. Although the current method takes into account one customer application (caller class) and delay based routing, the points listed above makes it very flexible to extend to multiple caller classes and different performance objectives (i.e., maximum revenue or minimal cost or even multiple objectives).

It is further appreciated, therefore, that the present invention provides a method and a system design for dynamic customized routing in NAA. This is a table-based customized routing algorithm which is incorporated into a new CRP-based load balancing method developed for the NAA. The CRP-based method provides enough flexibility to address different customer needs. The table-based scheme for customized routing not only allows for easy specification of the customer requirements but also provides a robust scheme in that an improperly specified rule or a set of conflicting routing decisions do not cause system problems but just result in suboptimal routing.

It is important to notice that the method and system disclosed hereinabove is flexible enough to address diverse customer needs. A diverse set of routing policies are obtained by just setting the four thresholds appropriately. For example, giving delay thresholds TH1 and TH2 the same very small negative value and TH3 and TH4 the same very large positive value would result in keeping all customer's sites in status Red 1 all the time. This would force the load balancing part of the routing scheme to be active all the time. Further, the conditions in the tables need not be based solely on the predicted delays but could also incorporate other objectives and/or parameters such as time of day.

Although the above description provides many specificities, these enabling details should not be construed as limiting the scope of the invention, and it will be readily understood by those persons skilled in the art that the present invention is susceptible to many modifications, adaptations, and equivalent implementations without departing from this scope. Although the automatic call distributor was described hereinabove in connection with the telecommunications system shown in FIGS. 1–3, it is understood by one skilled in the art that the present invention is not inherently coupled to the system shown in these figures, which simply illustrate a system in which the present invention may be practiced. In addition, according to the present invention, it is not necessary for any of the telemarketing agents to be connected to an ACD or a TC—i.e., all agents may be home agents.

It is further understood that although the present invention is hereinabove described in accordance with an interexchange network and with respect to its connection to LEC networks, the present invention, as understood by one skilled in the art, may be practiced and is equally applicable within an LEC network. Such an example is only illustrative of the many ways the present invention may be practiced in an LEC network, and it is understood that many equivalent implementations exist, and further, that the present invention may also be practiced across international network boundaries.

These and other changes can be made without departing from the spirit and the scope of the invention and without diminishing its attendant advantages. It is therefore intended that the present invention is not limited to the disclosed embodiments but should be defined in accordance with the claims which follow.

I claim:

1. A method of selecting a destination automatic call distributor from a plurality of automatic call distributors for a call routed over a telecommunications network, each automatic call distributor associated with a number of agents, said method comprising the telecommunications network implemented steps of:

receiving said call at an arbitrary time;

transmitting a signal according to information associated with said call to a customer routing point, said customer routing point receiving information related to automatic call distributor status from a data collection point, said data collection point receiving automatic call distributor information from each of said automatic call distributors, said customer routing point selecting said destination automatic call distributor from among said plurality of automatic call distributors based on the customer routing point generating a status prediction for at least one of the automatic call distributors, said status prediction dependent on the information related to automatic call distributor status and on the arbitrary time of the call;

receiving a routing label signal indicating said selected destination automatic call distributor from said customer routing point;

connecting said call to said selected destination automatic call distributor according to said routing label signal.

2. The method according to claim 1, wherein said information received by the customer routing point from said data collection point includes, for each of said plurality of automatic call distributors, number of agents available, number of calls in progress, average handling time, and cumulative number of calls.

3. The method according to claim 1, wherein said status prediction accounts for calls expected to arrive at the automatic call distributor and not handled by the customer routing point.

4. The method according to claim 1, wherein said information received by the customer routing point from said data collection point includes, for each of said plurality of automatic call distributors, number of agents available, number of agents idle, number of calls in queue, calls in progress, average handling time, and cumulative number of calls.

5. The method according to claim 1, wherein said information received by the customer routing point from said data collection point includes, for each of said plurality of automatic call distributors, number of idle agents, number of agents available, number of agents idle, number of calls in queue, call removal rate, and cumulative number of calls.

6. The method according to claim 1, wherein said status prediction includes a predicted call queue size of an automatic call distributor.

7. The method according to claim 1, wherein said status prediction includes a predicted delay time in queue until an agent at an automatic call distributor services the call.

8. The method according to claim 1, wherein said customer routing point includes a customized router means for determining the destination automatic call distributor by comparing customer specified parameters with the status prediction to identify a match.

9. The method according to claim 8, wherein said customer routing point includes a load balancer means for determining the destination automatic call distributor when said customized router means cannot identify a match by optimizing overall automatic call distributor status based on the status prediction.

10. The method according to claim 9, wherein said customer routing point includes a load balancer means for determining the destination automatic call distributor by optimizing overall automatic call distributor status based on the status prediction.

11. A method of selecting a destination automatic call distributor from a group of automatic call distributors in a system comprising a plurality of switching offices, a customer routing point, a data collection point, first data links linking the offices and the customer routing point, second data links linking each of the automatic call distributors to the data collection point, and a third data link linking the data collection point to the customer routing point, the method comprising the steps of: at each automatic call distributor, accumulating data representative of the automatic call distributor call load status; and repetitively transmitting the accumulated data to the data collection point; at the data collection point, repetitively transmitting a status signal representative of the accumulated data to the customer routing point;

at a switching office, transmitting a query message containing a number identifying the automatic call distributor group to the customer muting point in response to receipt of a call directed to the automatic call distributor group at an arbitrary call time; at the customer routing point, in response to the query message, generating an automatic call distributor status prediction for the arbitrary call time, said automatic call distributor status prediction based on said status signal and on the arbitrary call time; and transmitting a routing signal identifying the destination automatic call distributor to the switching office according to the automatic call distributor status prediction.

12. The method according to claim 11, wherein said customer routing point includes a customized router means for determining the destination automatic call distributor by comparing customer specified parameters with the automatic call distributor status prediction to identify a match.

13. The method according to claim 12, wherein said customer routing point includes a load balancer means for determining the destination automatic call distributor when said customized router means cannot identify a match by optimizing overall automatic call distributor status based on the automatic call distributor status prediction.

14. The method according to claim 11, wherein said customer routing point includes a load balancer means for determining the destination automatic call distributor by optimizing overall automatic call distributor status based on the automatic call distributor status prediction.

15. A method of selecting a destination automatic call distributor from a group of automatic call distributors in a system comprising a plurality of telecommunications switches and a customer routing point, the method comprising the steps of:

acquiring data at the customer routing point from each of the automatic call distributors representing the automatic call distributor call load status;

querying the customer routing point in response to a call received at an arbitrary time at one of the telecommunications switches and directed to the automatic call distributors;

generating, at the customer routing point in response to said querying, an automatic call distributor status prediction representing expected automatic call distributor status at said arbitrary time, the automatic call distributor status prediction based on said data and on said arbitrary time; and routing the call to the destination automatic call distributor according to said automatic call distributor status prediction.

16. The method according to claim 15, wherein said customer routing point includes a customized router means for determining the destination automatic call distributor by comparing customer specified parameters with the automatic call distributor status prediction to identify a match.

17. The method according to claim 16, wherein said customer routing point includes a load balancer means for determining the destination automatic call distributor when said customized router means cannot identify a match by optimizing overall automatic call distributor status based on the automatic call distributor status prediction.

18. The method according to claim 15, wherein said customer routing point includes a load balancer means for determining the destination automatic call distributor by optimizing overall automatic call distributor status based on the automatic call distributor status prediction.

19. The method according to claims 15, wherein the data acquired at said customer routing point for each automatic call distributor includes a number of agents available, a number of calls in progress, an average handling time for a call, and a cumulative number of calls offered.

20. The method according to claim 15, wherein the step of generating said automatic call distributor status prediction includes computing a function of a service rate, a rate of calls arriving at the automatic call distributor not handled by the customer routing point, the number of agents available, the number of calls in progress, and said time corresponding to the arbitrary time of call receipt.

21. An automatic call distributor system for routing a call directed to a group of automatic call distributors to a preferred one of the automatic call distributors over a telecommunications network, the system comprising:

means for receiving said call at the telecommunications network;

a customer routing point connected to said telecommunications network, wherein the customer routing point receives status information representing measured call load data of the automatic call distributors, and determines the destination automatic call distributor for said call according to predicting changes in automatic call distributor status over a time period elapsed since the measured call load data of the received status information was acquired, thereby providing an automatic call distributor status prediction; and means for routing said call to the destination automatic call distributor in response to a routing signal generated by said customer routing point indicating the destination automatic call distributor.

22. The system according to claim 21, wherein said customer routing point includes a load balancer means for determining the destination automatic call distributor by optimizing overall automatic call distributor status based on the automatic call distributor status prediction.

23. The system according to claim 21, further comprising a data collection point connected to said customer routing point and to each of said automatic call distributors, said data collection point repetitively acquiring data from each of said plurality of automatic call distributors relating to call load, and repetitively transmitting said status information to the customer routing point.

24. The system according to claim 21, wherein said status information includes time data indicating when the measured call load status was acquired for each of the automatic call distributors.

25. The system according to claim 21, wherein said customer routing point includes a customized router means for determining the destination automatic call distributor by comparing customer specified parameters with the automatic call distributor status prediction to identify a match.

26. The system according to claim 25, wherein said customer routing point includes a load balancer means for determining the destination automatic call distributor when said customized router means cannot identify a match by optimizing overall automatic call distributor status based on the automatic call distributor status prediction.

27. The system according to claim 25, wherein said customer specified parameters include an ordered list of preferred destination automatic call distributors and conditions that must be satisfied to allow routing of the call to each destination automatic call distributor.

28. The system according to claim 25, wherein said customer specified parameters include geographic preferences, least cost preferences, and delay time thresholds.

29. A system for selecting a destination automatic call distributor from a group of automatic call distributors for a call directed to the automatic call distributors, comprising:

a plurality of telecommunications switches;

a customer routing point;

means for acquiring data at the customer routing point from each of the automatic call distributors representing the automatic call distributor call load status;

means for querying the customer routing point in response to a call received at an arbitrary time at one of the telecommunications switches;

means for generating, at the customer routing point in response to said querying, an automatic call distributor status prediction representing expected automatic call distributor status at said arbitrary time, the automatic call distributor status prediction based on said data and on said arbitrary time; and means for routing the call to the destination automatic call distributor according to said automatic call distributor status prediction.

30. The system according to claim 29, wherein said customer routing point includes a load balancer means for determining the destination automatic call distributor by optimizing overall automatic call distributor status based on the automatic call distributor status prediction.

31. The system according to claim 29, wherein said customer routing point includes a customized router means for determining the destination automatic call distributor by comparing customer specified parameters with the automatic call distributor status prediction to identify a match.

32. The system according to claim 31, wherein said customer routing point includes a load balancer means for determining the destination automatic call distributor when said customized router means cannot identify a match by optimizing overall automatic call distributor status based on the automatic call distributor status prediction.

* * * * *